(12) United States Patent
Hewinson

(10) Patent No.: US 8,726,312 B1
(45) Date of Patent: May 13, 2014

(54) METHOD, APPARATUS, SYSTEM AND COMPUTER-READABLE MEDIUM FOR DYNAMICALLY EDITING AND DISPLAYING TELEVISION ADVERTISEMENTS TO INCLUDE INDIVIDUALIZED CONTENT BASED ON A USERS PROFILE

(75) Inventor: Philip Hewinson, London (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/490,252

(22) Filed: Jun. 6, 2012

(51) Int. Cl.
*H04N 7/10* (2006.01)
*H04N 7/025* (2006.01)
*H04N 21/2668* (2011.01)

(52) U.S. Cl.
CPC .................... *H04N 21/2668* (2013.01)
USPC .................... 725/34; 725/32; 725/35

(58) Field of Classification Search
None
See application file for complete search history.

(56) References Cited

U.S. PATENT DOCUMENTS

| | | |
|---|---|---|
| 2002/0062481 A1 | 5/2002 | Slaney |
| 2007/0038516 A1 | 2/2007 | Apple |
| 2008/0046312 A1 | 2/2008 | Shany |
| 2010/0153990 A1* | 6/2010 | Ress et al. ............... 725/34 |
| 2010/0198683 A1* | 8/2010 | Aarabi ............... 705/14.49 |
| 2010/0228610 A1 | 9/2010 | Kaftan |
| 2011/0197224 A1 | 8/2011 | Meijer |
| 2011/0202953 A1* | 8/2011 | Johnson et al. ............ 725/35 |
| 2012/0072936 A1* | 3/2012 | Small et al. ............... 725/10 |
| 2012/0109746 A1* | 5/2012 | Dyor et al. .......... 705/14.49 |
| 2012/0123890 A1* | 5/2012 | Nathan ............... 705/26.1 |
| 2012/0323581 A1* | 12/2012 | Strietzel et al. .......... 704/276 |

* cited by examiner

*Primary Examiner* — Nathan Flynn
*Assistant Examiner* — Omar S Parra
(74) *Attorney, Agent, or Firm* — Dickinson Wright PLLC

(57) ABSTRACT

A computer-implemented method of dynamically determining television advertisements to be provided to a customer includes obtaining profile information of a customer; selecting an advertisement based on the obtained profile information; editing the selected advertisement to include content related to the obtained profile information; and delivering the edited advertisement to the television.

20 Claims, 3 Drawing Sheets

METHOD, APPARATUS, SYSTEM AND COMPUTER-READABLE MEDIUM FOR DYNAMICALLY EDITING AND DISPLAYING TELEVISION ADVERTISEMENTS TO INCLUDE INDIVIDUALIZED CONTENT BASED ON A USERS PROFILE

BACKGROUND

This application relates to identification of and delivery of multimedia content of most interest to a viewer, such as advertisements and programming, from television service providers such as cable TV, satellite TV, and fiber optic TV, to computerized multimedia devices such as GoogleTV™, smart phones, and various types of wireless devices.

Television advertisements have heretofore been targeted to viewers only on a very general demographic basis, wherein an identical advertisement is sent to many viewers during a predetermined commercial break, regardless of the individual preferences of the viewers. The advertisements that are shown are very broad, untargeted, and often not very relevant to a given viewer watching them. Advertisers currently know aggregate demographic information about the general audience of a television program, and the advertisers target ads during a program based on what is relevant to its most broad demographics. However, ads may not be relevant to a large percentage of the audience despite being relevant to much of the audience.

Therefore, there is a need in the advertising industry for more dynamic and personalized advertisements.

SUMMARY

In embodiments herein, a method of dynamically determining television advertisements to be provided to a customer includes editing an advertisement selected for an individual customer to include content related to social networking profile information or viewing history, and displaying the edited advertisement on the television. The selected advertisement to be provided to the customer may be based on an individualized ad determined in accordance with interests and demographics of the specific customer obtained from the social networking profile information, or may be based on a generic ad delivered to a wide audience as described above. In either case, in embodiments, the advertisement is edited to include personalized content related to social networking profile information or other information of the customer obtained through the Internet or the customer's viewing history. The added matter may be any multimedia content obtained through the social networking profile information or other information such as viewing history. Computerized multimedia devices such as Google TV™ are configured with functionality to enable dynamic display of the edited advertisement that is specifically targeted to the individual viewer.

In embodiments herein, viewers may explicitly identify themselves each time they sit in front of the TV, or may be automatically detected via a video camera. This type of identification is essentially "logging in" to watch TV. Explicit incentives for this can be provided such as special deals on advertised products for watching a particular show, or restricting access to certain shows. It should be noted that the term. "TV" as used herein refers to a home TV system including all of the components thereof and need not be limited to merely the TV box itself.

In embodiments, a viewer (or viewers) of the TV may be detected and identified by picking up the viewer's face with a camera (e.g., a wide-angled front-facing camera) embedded in or mounted on the TV box or some component of the TV system, and using facial recognition to recognize the viewer's face from faces stored on the TV. These stored faces are associated with logon information, for online social networking or other Internet sites, that is also stored on the TV. Then, these online social networking or other Internet sites are accessed and profile information is obtained therefrom. Next, the profile and demographic information derived therefrom may be used to create a personalized and edited ad for display on the TV.

In order to deliver personalized and edited ads to a viewer watching during a given viewing session, it is of course firstly important to understand who the viewer is that is watching the advertisement. Requiring the viewer to log onto their social networking profile accounts on his TV can give a clue as to who is watching the TV, but this may not necessarily be accurate (especially if more than one person lives at a certain location or other people often visit to watch TV). However, this clue can help optimize the system of this application as described in detail below.

In embodiments, a TV has a wide-angle front-facing camera embedded, for example, into the top center of the TV, in order to capture the faces of all viewers watching the TV (i.e. if a viewer can see the TV, the wide-angle camera should be able to see the viewer). However, the camera may be mounted at any position, even a position structurally apart from the TV box. The TV also has an Internet connection. It should be noted that a viewer who "logs on" provides his account information for his social networking site. This account information may be stored at the TV, and subsequently, the stored account information may be used for this viewer based on recognition of his face, thus making it unnecessary for him to log in each time he begins a new viewing session. It should be noted that alternatively the profile information may be locally stored at the TV itself and accessed during the ad editing procedure described herein.

It should be further noted that as used herein, the "identity" of a viewer merely relates to a "user profile." The TV user profile can be associated with a social networking profile, or with information from a social networking profile. Only these anonymized user profiles may be provided to advertisers, rather than actual user identities, for privacy considerations.

An opt-in/out may be provided for each viewer in order to address privacy concerns that may exist. As one example, users can set up, on their social networking profile, limitations to what the TV can access. Other techniques for opt-in/out or anonymization of the system may be envisioned by those skilled in the art.

Once the TV detects who is currently watching by locating their online social networking profiles or viewing history, the TV then further queries the viewer's profiles at the social networking platform or platforms to identify information that will draw out the viewer's preferences to enable the system to infer demographics and deliver personalized advertisements to the viewer. If the system detects that a number of viewers are watching the TV simultaneously, the system may select advertisements that will best cater to the overall audience, either by finding advertisements that are relevant to all parties or a single advertisement that is highly targeted for each individual viewer or at least certain individual viewers in the audience. This requires the TV to have access to a full corpus of advertisements appropriately categorized so that the system is able to select the best advertisements to display for the viewers watching. In embodiments, the ads may be stored on an ad server, and the ad server may receive the profile and preference information, infer demographics and determine relevant personalized ads for delivery to the viewer(s). Alternatively, the TV system itself may obtain the profile and preference information from the social website and infer demographics therefrom, and provide this information to an ad server which then determines personalized ads for delivery to the viewers.

As the viewer(s) watching the TV is/are identified, other information targeted to individual viewer(s) may be delivered to the TV for the viewer(s) to see. For example, discounts and offers personalized specifically for the viewer(s) watching can be delivered—e.g., if the specific viewer is a member of a club card for a specific organization such as a supermarket, specific offers can be delivered to the viewer based on their past spending habits and the number of points they have accumulated. This has the capability to deliver very targeted and personalized advertisements and offers to the viewer that will be far more compelling and increase the likelihood that the viewer will act upon them.

Furthermore, in embodiments, given that the TV is network—(e.g., Internet) connected, the advertisements may be made interactive so that the viewer can respond/interact directly with the advertisement. As the smart TV detects who this viewer is (or the group of viewers) and can potentially detect the exact viewer by asking the viewer interacting with the TV to confirm, the viewer's actions can be directly stored against his profile. The viewer can make a purchase then and there with a credit card or any form of payment attached to the online profile. Also, another specific action may be tied to the viewer's identity such as delivery of more information after the viewing of the advertisement.

In embodiments, the ads involve an inventory and infrastructure of TV ads. Google+™ may be the viewers' online social networking platform, and the corresponding profiles may be used, along with other technologies such as facial recognition within the Android platform.

In embodiments, the system may be implemented with respect to TV programs, TV advertisement providers, TV service providers such as a cable, satellite or fiber optic TV company, and TV manufacturers, working in concert with each other. However, the system also can operate with any other social networking platform such as Facebook™, Twitter™, or others.

In embodiments, "attendance" info, illation may be obtained and provided to advertisers. This information involves whether the viewer(s) actually stayed in the room while the commercial or other content played. Estimated demographic breakdown of the audience can be provided as feedback to advertisers. Further, in addition to the number of people who stayed/left, the particular individuals who (from a demographics point-of-view) stayed/left may be observed and provided to advertisers. Before the commercial is shown, the profiles of those present are used to determine what ad to show. When the commercial ends, the device should send feedback on the profiles of the individuals who remained watching during the ad. Advertisers may analyze the data to determine how effective their ad is to certain groups.

In embodiments, the system may include demographics-based advertiser bidding. That is, advertisers bid on having their ad being shown to particular demographic groups, paying more or less per viewer based on the inferred audience distribution as determined by the method of this application. For example, if an advertiser prefers to have their ad shown to a male aged 25-40, they could pay a premium per viewer in this demographic as compared with all other viewers. Ads per viewer(s) can be determined by a real time bid when it comes time to show a commercial. Since a group of viewers in the same room may be of mixed demographics (i.e., a family watching TV at the same time), knowing the exact combination of demographics could inform bidding. For example, in showing a given commercial, five men watching a football game may be more valuable to an advertiser than two parents and three children; in contrast, two parents and three children may be more valuable to an advertiser for a another type of commercial.

It is noteworthy that the associated facial recognition software alone need not be capable of determining demographics. The facial recognition software need not detect the gender, age, and so on of the viewer. Instead, the system merely relies on the facial recognition software to recognize the same person at different times and use his viewing history (and/or online profile) to infer demographics. From a manufacturing perspective, this has an advantage of reducing hardware requirements and cost since it does not require as much computing power or camera quality. A person's interests as determined by his viewing history (or online activities) may actually be more relevant to advertisers than gender and age.

In embodiments, a computer-implemented method of dynamically determining television advertisements to be provided to a customer includes obtaining profile information of a customer; selecting an advertisement based on the obtained profile information; editing the selected advertisement to include content related to the obtained profile information; and delivering the edited advertisement to the television.

In embodiments, an advertisement server includes a profile information obtaining unit configured to obtain profile information associated with a customer; an advertisement selecting unit configured to select an advertisement based on the obtained profile information; an advertisement editing unit configured to edit the selected advertisement to include content related to the obtained social networking profile information; and an advertisement delivery unit configured to deliver the edited advertisement to the television.

In embodiments, a computer-implemented dynamic advertising system includes a television configured to access the Internet and further configured to display television programming; and an advertisement server connected to the television over the Internet, wherein at least one of the television and the advertisement server are configured to select an advertisement based on obtained profile information of a customer, and edit the selected advertisement to include content related to the obtained profile information of the customer.

In embodiments, a computer-readable storage medium containing program code enabling dynamic determining of television advertisements to be provided to a customer includes program code for obtaining profile information of a customer; program code for selecting an advertisement based on the obtained social networking profile information; program code for editing the selected advertisement to include content related to the obtained social networking profile information; and program code for delivering the edited advertisement to the television.

BRIEF DESCRIPTION OF THE DRAWINGS

The embodiments of this application will be explained in more detail in conjunction with the appended drawings, in which.

DETAILED DESCRIPTION

Exemplary embodiments will now be described. It is understood by those skilled in the art, however, that the following embodiments are non-limiting and exemplary only.

Techniques for delivering content and ads of most interest to individual viewers are based on smart TV platforms. Computerized multimedia devices (e.g., Google TV™ a smart TV platform for set-top boxes and HDTVs based on Android™ operating system) have the capability of being configured to display different ads to each device and viewer(s) thereof individually and dynamically. With respect to technical features, Google TV™ enables searching the Internet through the TV using a search bar. Google TV™ also provides web browsing functionality by using a web browser—e.g., Google Chrome™. It may also provide programs/applications for web applications/sites such as YouTube™, Netflix™, AmazonVideo on Demand™, Twitter™, Flickr™, Picasa™, Napster™, Pandora™, and the like. It may also allow integration of smart phones with the TV for exchange of various activities. It may also enable a mobile phone such as an Android™—or iOS™—enabled phone to be used as a remote. It may also include a wireless remote control with full QWERTY keypad for controlling the TV. Various launch devices that may utilize Google TV™ have an Android™ operating system and may also have a compatible processor that may be provided with extra graphics hardware capable of capturing and decoding video. For example, Intel™ CE4100 media processor may be utilized by the launch devices. It may utilize a multimedia platform such as Flash 10.1™ beta. Google TV™ may provide a plurality of interaction screens such as a home screen in the form of a two-pane grid interface that may be a transparent layer over the current TV content.

The ability to employ the capabilities of such smart TVs and provide media ads that are customized for each viewer (or group of viewers watching the same television device) is beneficial for both advertisers and consumers. Advertisers can better focus their advertising budgets on the people who are more likely to buy their products/services. Consumers benefit by seeing more relevant, and perhaps fewer, ads.

Figure 1:
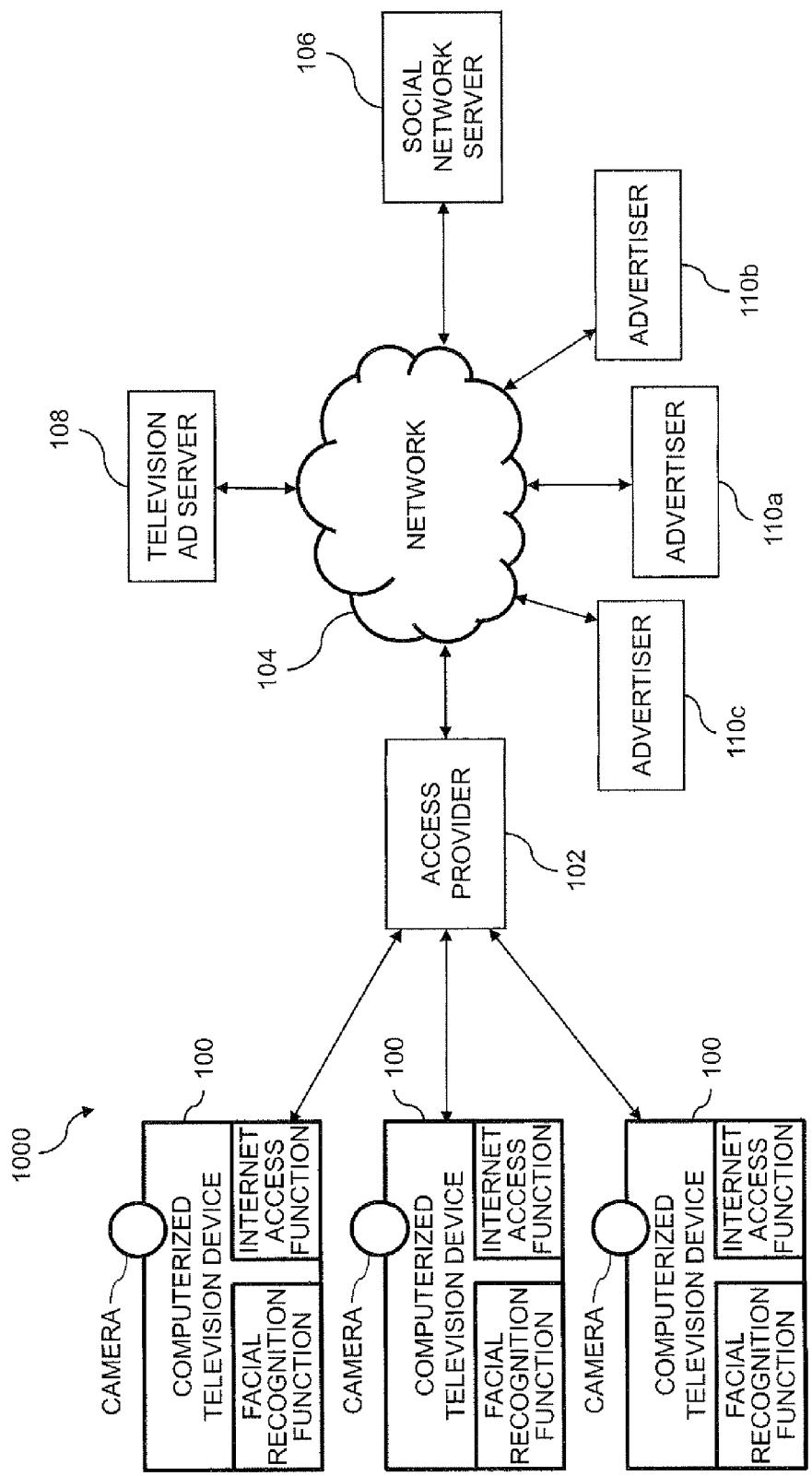
FIG. 1 illustrates a dynamic advertising system according to an embodiment.

FIG. 1 is a block diagram that illustrates a view of a computing/networking environment 1000 configured for gathering and analyzing information to enable targeted advertising, according to one embodiment. The environment may include an ad entry, maintenance and delivery system (simply referred to a television ad server) 108. The ad server 108 may be run by a television service provider such as a satellite, cable or fiber optic TV or multimedia system provider, a mobile service provider with video functions, an advertisement network, or any other source of advertising content. Advertisers may directly, or indirectly, enter, maintain, and track ad information in the ad server 108. The ads may be in the form of graphical ads, such as so-called banner ads, text only ads, image ads, display ads, audio ads, video ads, ads combining one of more of any of such components, etc. The ads may also include embedded information, such as a link, and/or machine executable instructions.

It should be noted that the environment for the targeted advertising of this application may be applied to all forms of content delivery, including broadcast TV/radio, web and cellular platforms, and any other types of multimedia systems.

Each server may include an operating system that provides executable program instructions for the general administration and operation of that server and may include computer-readable storage media storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein. The computer-readable storage media does store data relating to information signals.

As shown in FIG. 1, a computerized television device 100 (smart television) includes an internet access functionality including input/output devices such as a touch interface, a keyboard, and/or a voice control interface (or other input interface) as well as a network interface used to connect the computer system to the access provider 102 and network 104. Similarly, social networking server 106 and television advertiser server 108 may include components similar to the ones described above. Television 100 also includes a mounted or embedded camera which may be a wide-angled front-facing camera that detects the viewers of the TV by picking up the viewers' faces. In some cases, the camera may only be enabled in response to an affirmative user action, or may allow the user to disable the camera. In some cases, images captured by the camera may not be analyzed or communicated to a third party (e.g., an advertiser or the TV provider) without consent or opt in, or if a viewer affirmatively opts out. It should be noted that this application also applies to a "dumb" TV connected to a smart box which includes a computer processor, camera and other functionalities described herein.

In more detail, FIG. 1 depicts a dynamic advertising system 1000 according to an embodiment. As shown in FIG. 1, the dynamic advertising system 10 includes customers 100a, 100b, 100c, an access service provider 102 (such as an Internet service provider), a network 104 (which may include privately owned communication lines as well as the Internet), a social network service provider 106 (such as Google+™ or Facebook™), an ad server 108, and advertisers 110a, 110b, and 110c.

Each of the TVs 100 can be, for example, a smart television which has Internet or other network access capabilities. The TVs can be in separate or same residences.

The access provider 102 can be, for example, a cable television company or Internet service provider which provides the TVs with access to cable television programming, as well as access to the Internet. The access provider 102 typically owns and/or operates an access network which provides customers with access to larger networks such as the Internet. The access provider 102 may enter into an agreement with the customers, were the agreement specifies that the access provider 102 provides access to television programming, the Internet, and other services in exchange for a fee. The network 104 may include privately owned communication lines and the Internet.

The social network service provider 106 operates a social networking site which is accessible by the customers using TVs 100 through the network 104. For example, the social network provider 106 may own and/or operate a service which enables users to create a customized user profile, such as Google+™, Facebook™, LinkedIn™, Twitter™, etc. Each of the customers using TVs 100 can create and edit a customized user profile which is stored by the social network provider 106.

To access this customized user profile, the customer can, for example, log onto a website provided by the social network provider 106 using his or her Smart TV 100. Also, the log-in can happen if another device (phone or tablet) of the user that is logged into the network, comes into range of the smart TV, and sends log-in information or profile information from the social network to the TV. The Smart TV 100 may have an associated keypad and a screen, or other input devices, which enable the customer to initiate a communication session over the network 104. Using his username and password, the customer can log onto his page of the social network service provider 106 by exchanging data with the social network service provider 106 through the network 104. For example, the Smart TV 100 and social network service provider 106 may engage in a TCP/IP communication session. The accessed customer's page at the social network service provider 106 is loaded to and displayed on the Smart TV 100 of the customer. The accessed customer's page includes his customized user profile. By accessing the social network, the customer may allow the smart TV to make use of information stored in the profile.

The social networking profile information on the customized user profile may include a wide range of information related to the customer. For example, the social networking profile information may include basic biographical information (e.g., name, age, birthday), employment information (e.g., current and past jobs), education information (e.g., current and past schools attended), photographs, video files, addresses (e.g., current and past addresses), information related to friends and family members, information related to preferences in movies, music, fashion, cars, and other cultural phenomena, and so on. This social networking profile information can be modified and stored by the social network service provider 106. For example, customer 100a may update his or her profile to indicate a preference for a certain pop band.

The advertisement server (hereinafter, also referred to as "ad server") 108 is an apparatus which is configured to perform various functions related to the selecting and editing of advertisements. The ad server 108 is described in greater detail below in the discussion of FIG. 2.

Figure 2:
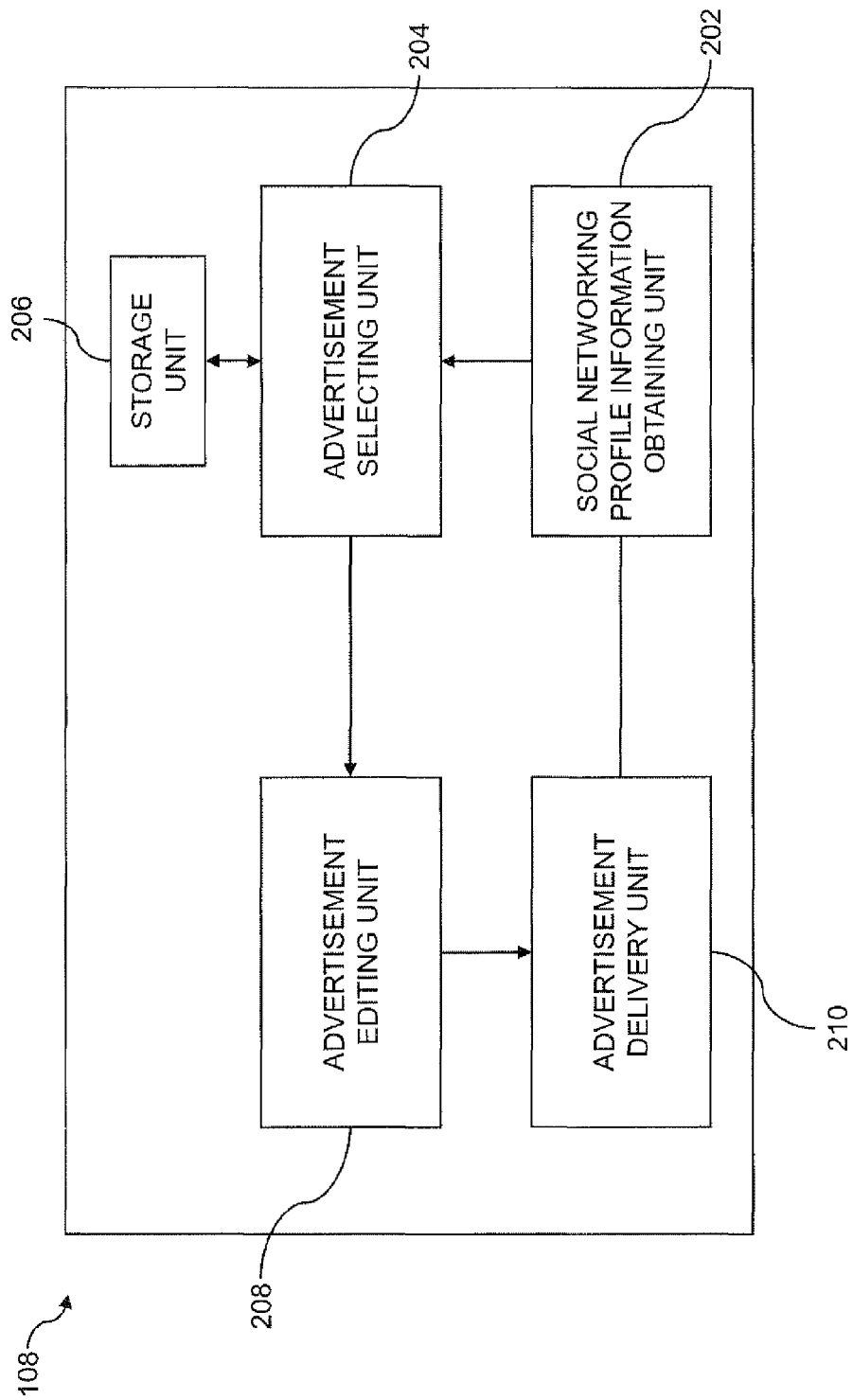
FIG. 2 illustrates a detailed illustration of the ad server 108 shown in FIG. 1.

FIG. 2 illustrates the functions of ad server 108 shown in FIG. 1. As shown in FIG. 2, the ad server 108 includes a social networking profile information obtaining unit 202, an advertisement selection unit 204, a storage unit 206, an advertisement editing unit 208, and an advertisement delivery unit 210. The ad server 108 obtains a corpus of advertisements from advertisers 110a, 110b and 110c which are entities that create and/or distribute advertisements for various types of products or services. Advertisers 110a, 110b and 110e using ad server 108 may have many different types of arrangements with televisions networks, so that the advertisements created by the advertisers 110a, 110b and 110c are delivered by the ad server 108 to the Smart TVs 100 of the customers during commercial breaks.

The social networking profile information obtaining unit 202 obtains social networking profile information of a customer (or customers). The social networking profile information obtaining unit 202 may obtain the social networking profile information of a customer (or customers) via the smart TV 100 through which the customer has logged onto the social networking site. Alternatively, the social networking profile information may be stored on the smart TV 100 and accessed by social networking profile information obtaining unit 202. Thirdly, the identity of the customer (or customers) currently viewing the television programming may be obtained through facial recognition as discussed above, and using this identity information, the social networking profile information obtaining unit 202 may access the Internet to obtain the profile information thought some website on the Internet. This latter is accomplished by accessing, for example, the public part of the identified user's social networking page or from a publically available profile of the identified secondary viewer. In any of these ways, the social networking profile information obtaining unit 202 may obtain the social networking profile information of the identified customer (or customers).

As noted above, there are several ways to determine the identity of a person or group of people who are currently viewing television programming. For example, the identity of viewers can be determined based on login information. Alternatively, the identity of viewers can be determined based on facial recognition techniques. Moreover, the identity of viewers can also be determined based on near-field communication (NFC) techniques. NFC techniques include, for example, using a device (e.g., handheld card, cell phone, etc.) which wirelessly communicates with a Smart TV 100. When the person carrying the wireless device taps the Smart TV 100 with the wireless device or moves within a predetermined range of the SmartTV, data is exchanged between the wireless device and the Smart TV to indicate that the person carrying the small portable device is within the predetermined range of the Smart TV 100.

The advertisement selection unit 204 selects an advertisement based on the social networking profile information obtained by the social networking profile information obtaining unit 202. The selection process can be based on any of various different types of rules and algorithms. The advertisement selection unit 204 may select an advertisement from among a wide variety of generic advertisements (hereinafter, also referred to as an "ad corpus") which are created by the advertisers 110a, 110b and 110c and stored in the storage unit 206. Typically, the ad corpus includes many different types of generic advertisements which are intended to advertise many different types of products or services. Each of the advertisements included in the ad corpus typically will include a combination of video data, audio data and metadata, although it is also possible to include other types and combinations of data as well.

The selection of an appropriate advertisement may be based on many different criteria and rules. For example, each advertisement in the ad corpus may include several different pieces of metadata. To select an appropriate ad, after the social networking profile information obtaining unit 202 obtains the social networking profile information, the advertisement selection unit can compare the social networking profile information obtained from a customer with the metadata of each of the advertisements stored in the ad corpus, and select the advertisement which has the highest number of matches between the metadata and the social networking profile information. Furthermore, different types of metadata can be weighted differently, to give priority to certain types of metadata in comparison to other types of metadata. The ad server 108 may include an index or indices associating each of the advertisements included in the ad corpus with the corresponding metadata.

The storage unit 206 stores the ad corpus, which includes a group of different advertisements from which the advertisement selection unit 204 can select an advertisement. As shown in FIG. 2, the ad corpus may be stored in the storage unit 206 of the ad server 108. Alternatively, the ad corpus may be stored at the access provider 102, stored at both the access provider 102 and the ad server 108, or stored at another entity altogether.

The advertisement editing unit 208 edits the advertisement selected by the advertisement selection unit 204 to include content related to the social networking profile information of the customer. The user can select what in the profile can be accessed by the TV for this purpose (via opt in/opt out, and/or other options), and the user can select what in the profile can be viewed by TVs in which the user's friends are logged in (e.g., access via another's profile). Also, an anonymization function may be employed to anonymize the friends who are not logged in. Any technical function known to those skilled in the art may be employed in this anonymization function to allow a user to control privacy and the user's data. Such existing anonymization techniques are directed to privacy preserving of social network data with respect to privacy, background knowledge, and data utility. Existing anonymization methods for privacy preservation generally fall into two categories: clustering-based approaches and graph modification approaches. Those skilled in the art may devise any number of anonymization functions to implement protection systems with respect to privacy.

To edit the selected advertisement, the advertisement editing unit 208 may include different combinations of hardware and software configured to embed/inject dynamic information into specific audio/video content. The dynamic information is information related to the social networking profile information of the user. For users who opt in, the edited advertisements may include injected images, injected audio, injected video, or a combination thereof. Each of these different types of editing techniques is explained below in detail.

Injected Images

Injected photos can be actual photos taken from a user's social network of the user, the user's friends, and the user's family. These can be in photo/image/camera specific advertisements or advertisements that have no direct relation to photos, but often display photos for a personal touch (e.g. a family buying insurance for their home or home heating/gas with photos displaying in their home within the advert). This could be even more powerful if taken real-time from the most recent photo of the user taken (e.g. one that may have just been taken a few minutes ago by a friend and automatically uploaded).

Injected photos can also be photos of the user's face (or their faces of their friends or families) on very short, slightly distant and slightly blurred video shots of people in the video with some dynamic distortion to make the image of their face appear to move with the body within the video so that a still image can look real-life and credible within the video. Of course, the actual person in the video should match the rough profile of the user or user's contact they are supposed to match (which can be done by querying the basic attributes on the user's social network site such as gender, age, height etc.)

A large store that sells many different items such as Amazon™ or a high street retailer like John Lewis™ (in the UK) could inject items that are directly relevant to the user. These could be taken from a gift list the user keeps updated and which is connected to the user's profile, or items that the user has purchased before by querying the user's purchase history. Furthermore, image recognition on existing items identified in photos (e.g. on past birthdays) could be used to understand the user's likes/dislikes, and photos of these items could be displayed during the advertisement. Often, users write posts/tweets that demonstrate the user's likes—for example, a user may take a picture of a chocolate fondue or state how amazing one is. This information could be extracted in real-time as soon as the user has posted the message/image and it could also be inferred that the user has this very present like and images of these items could be displayed in the advertisement.

Injected photos can also be very simple injected words/phrases that are directly relevant to the user. This could be for example, call <number> on your Galaxy Nexus™ if the user owned a Galaxy Nexus™ phone. The user's name could be injected in a direct textual call to action such as "Phil, call us now on . . . ". The name of a user's close friend or family member (e.g. spouse) could be used to make a call to action more deeply personal and effective—e.g. "Buy one now—<best friend's name> would love it!". Any other facts inferred from a user's online profile could be used in many more examples (some other examples of inferred facts are stated below under the Audio section). These would be especially powerful using real time facts derived from information posted most recently by the user of one of their contacts.

The user's address can be used to get pictures of the user's house from StreetView™ (for example) and this information could be used within the advertisement to give the impression that the advertisement is taking place at, or is strongly related to, the user's own home. For example, the camera could quickly zoom in on the static image of the user's house and the rest of the advertisement could be filmed in a generic home that could be the user's, and would give them the impression that it is.

The user's current location can be used to get pictures from Street View™ and these pictures could be used within the advertisement in a similar way to that described above—this would require access to real time location information about the user (as captured for example from the GPS coordinates of the user's smartphone).

The user's favorite colors, brands, styles etc. could be inferred based on the clothing the user wears in the photos they are tagged within. These preferred attributes of the users could be used to color the advert appropriately. For example, the main character could be wearing clothing very similar to the user to draw a much greater, connection with them as the user could relate more strongly with them and will more likely be influenced by them. Moreover, these colors, logos etc. could be displayed in other parts of the advertisement to get the user's trust, attention and allegiance. Real-time photos of the user that have just been uploaded could be prioritized to color the advertisement based on colors that the user likes or even a color of something the user is actually wearing at the time or even an entire outfit. Of course, this technique can be made subject to opt in/opt out in order to address any issues of privacy or the like that the viewer(s) may have.

Injected Audio

The user's name can be injected on the audio track of the actor/narrator so that it appears that the character in the advert is talking directly to/about the user. As a live actor's lip movements might give this away, the live actor's lips may need to be hidden when the user's name is called out, or even more intelligently, a variety of lip movements could be recorded to cover different names that produce different lip movements. The audio injection would have to match the voice of the actor/narrator, so very intelligent voice-matching technology would need to do this in real time given a textual name of a user.

Similarly, other facts about the user and the user's contacts could be injected to make the customized advertisement deeply personal. This technique could factor in the user's age if the advertiser was, for example, advertising an event or gift that may suit the user and state that the user's "50th birthday" would be a great opportunity to celebrate with a certain event/gift. Furthermore, this technique could factor in the upcoming birthdays of the user's friends and specifically call out the dates of the upcoming birthdays. This technique could form a helpful reminder for the user and give the user ideas on what to do/buy for the user's friends. This technique could also include countries visited (if this is recorded) to identify favorite locations for holiday adverts, or could simply list of names of the user's closest friends just to more deeply connect with the user. Many more examples exist of taking information inferred from the user's profile and injecting these facts into the audio stream of the actor/narrator. Of course, real time information that has just been posted is more likely to be more impactful.

If a lot of audio of the user were captured against the user's profile, this could be analyzed and sophisticated technology could be used to extract all keywords, accents, etc. of the user's voice and potentially used to mimic the user's voice in saying a totally different phrase to what the user has said before. This could then have the effect of the user's voice being used directly to say certain things within the advert. For users who opt in to this function, this could be even more interesting or entertaining to the viewer and/or their friends watching the TV with them, if the user's friend or close relative were to say something within the advertisement. Of course, as with other features herein, this technique can be made subject to opt in/opt out in order to address any issues of privacy or the like that the viewer(s) may have.

The user's favorite music could be extracted/inferred from the user's online profile and the user's friends' favorite music and this music could be played as background music to the advertisement. Using some music services, it can be known in real time what music the user is currently or has very recently listened to. This music can be used within the advert to have even more impact.

Injected Video

The videos that the user has uploaded or that the user's friends have uploaded that the users are tagged/identified within could potentially be used in intelligent ways within advertisements. For example, if sophisticated analysis was performed on these videos, snippets could be identified of the user saying certain things. If these snippets matched certain portions of the advertisement that were applicable, the snippets could be embedded within the advertisement in intelligent ways. For example, if the user was found to be saying "check this out . . . ", this could be played at the start of an advertisement before advertising a very interesting/exciting scene, for example. This would have a very strong impact on the user, as the user would effectively be introducing the advertisement. Likewise, potentially even more powerfully, if a friend of the user was recorded in a similar way for the user, this could possibly be even more effective (i.e. the friend would introduce the advertisement). The movement of a user within the user's videos could be analyzed and if similar movement was found to that of the movement of an actor in an advertisement, this video of the user could be extracted from the user's video and superimposed onto the advertisement to replace the character for a portion of the advertisement. Likewise, this technique could also be applied to any of the user's contacts to add a very personal touch to the advert (i.e. the user and/or the user's friends would effectively be live, moving characters in the advertisement).

Furthermore, a combination of the above-described techniques can be used. For example, a combination of images, audio and video can be injected into an advertisement during the editing process.

The advertisement delivery unit 210 prepares the edited advertisement to be delivered to the customer, and performs the delivery of the advertisements. For example, the advertisement delivery unit 210 formats and encodes the edited advertisement to properly deliver the edited advertisement over the network 104 to the access provider 102, which then delivers the edited advertisement to the appropriate customer. To deliver the edited advertisement, the advertisement delivery unit 210 physically transmits the edited advertisement over the network 104 to the customer.

The delivery of the customized advertisements to the customers may occur in many different ways, including, for example, real-time, non-real-time, and hybrid formats. These delivery formats relate to the speed at which the ad server 108 performs the selection and customization of an advertisement.

In the real-time delivery format, advertisements are customized and delivered in a very quick, nearly instantaneous format as soon as the customer begins viewing a television program. At or near the moment when customer 100a begins viewing television programs on his or her Smart TV, the ad server 108 begins the process of selecting and customizing an advertisement based on social networking profile information, as described above in the General Overview of a First Embodiment section. Thus, for example, if the customer 100a begins viewing a television program at time (x), and then a commercial break occurs at time (y) which is thirty seconds after (x), the ad server 108 selects, customizes and delivers an advertisement to the Smart TV of the customer 100a so that the delivered advertisement is displayed during the commercial break at time (y). To perform this real-time delivery format, a real-time connection should be established between the Smart TV of the customer 100a and the ad server 108. A benefit of the real-time delivery format is that the most recent social networking profile information can be taken into account in the ad customization process. For example, if the customer 100a edits his or her social networking profile to indicate a preference for a certain pop music group while simultaneously viewing a television program, the ad server 108 can create the pop music group ad simultaneously while the customer 100a is viewing the television program, and deliver the created pop music group ad to a Smart TV of the customer 100a at the next available commercial break of the television program.

In contrast, in the non-real-time delivery format, advertisements are selected and customized before the user begins viewing television programming, and then stored until an appropriate commercial break. In this case, the ad server 108 begins the process of selecting and customizing an advertisement based on social networking profile information, as described above in the General. Overview of a First Embodiment section, during a time period when the customer is not viewing television programming. For example, the ad server 108 can select and customize advertisements hours, days or weeks in advance of when the customer begins viewing the television programming. To perform this non-real-time delivery format, a real-time connection between the Smart TV of the customer 100a and the ad server 108 is not required. Then, once the customer 100a begins viewing television programming, the ad server 108 can deliver the customized ad during the next commercial break. A benefit of the non-real-time delivery format is that the non-real-time delivery format does not require the ad server 108 to operate at very fast processing speeds.

In the hybrid delivery format, certain advertisements are delivered in the real-time delivery format and other advertisements are delivered in the non-real-time delivery format. The hybrid delivery format may be used, for example, so that advertisements which are customized by the ad server 108 are delivered in the non-real-time format, and advertisements which are not customized by the ad server 108 are delivered in the real-time format, based on the assumption that customizing the advertisements will take additional time, which may make a real-time delivery technically difficult.

Furthermore, in order to enable the access provider 102 to deliver a plurality of customized advertisements to the appropriate customers, various mapping techniques to map the customers with corresponding advertisements may be employed. As shown in FIG. 1, there may be a plurality of customers 100a, 100b and 100c, and a plurality of advertisers 110a, 110b and 110c. Thus, in order to ensure that each customized advertisement is delivered to the correct customer, mapping can be performed between the customers and the advertisers. For example, as described above, the ad server 108 may create the Pop music group ad for customer 100a. Thus, to ensure that the pop music group ad is correctly delivered to the Smart TV of customer 100a (instead of the Smart TVs of customers 100b or 100c), a mapping should take place between the pop music group ad and the customer 100a.

A first mapping example is for the ad server 108 itself to map customized advertisements to customers. In this case, the ad server 108 includes a storage device to store information mapping customers to respective ads. According to this first mapping example, after the ad server 108 creates the pop music group ad for customer 100a, the ad server 108 transmits the pop music group ad to the access provider 102 along with mapping information mapping the pop music group ad to customer 100a. As a result, the access provider can analyze the received mapping information and determine that the pop music group ad should be transmitted to the Smart TV of customer 100a.

A second mapping example is for the access provider 102 to map customized advertisements to customers. In this case, the access provider 102 includes a storage device to store information mapping customers to respective ads. According to this second mapping example, after the ad server 108 creates the pop music group ad for customer 100a, the ad server 108 transmits the pop music group ad to the access provider 102, without any mapping information. Then, upon receiving the pop music group ad, the access provider 102 can access the storage device to determine the mapping between the pop music group ad and the corresponding customer.

Figure 3:
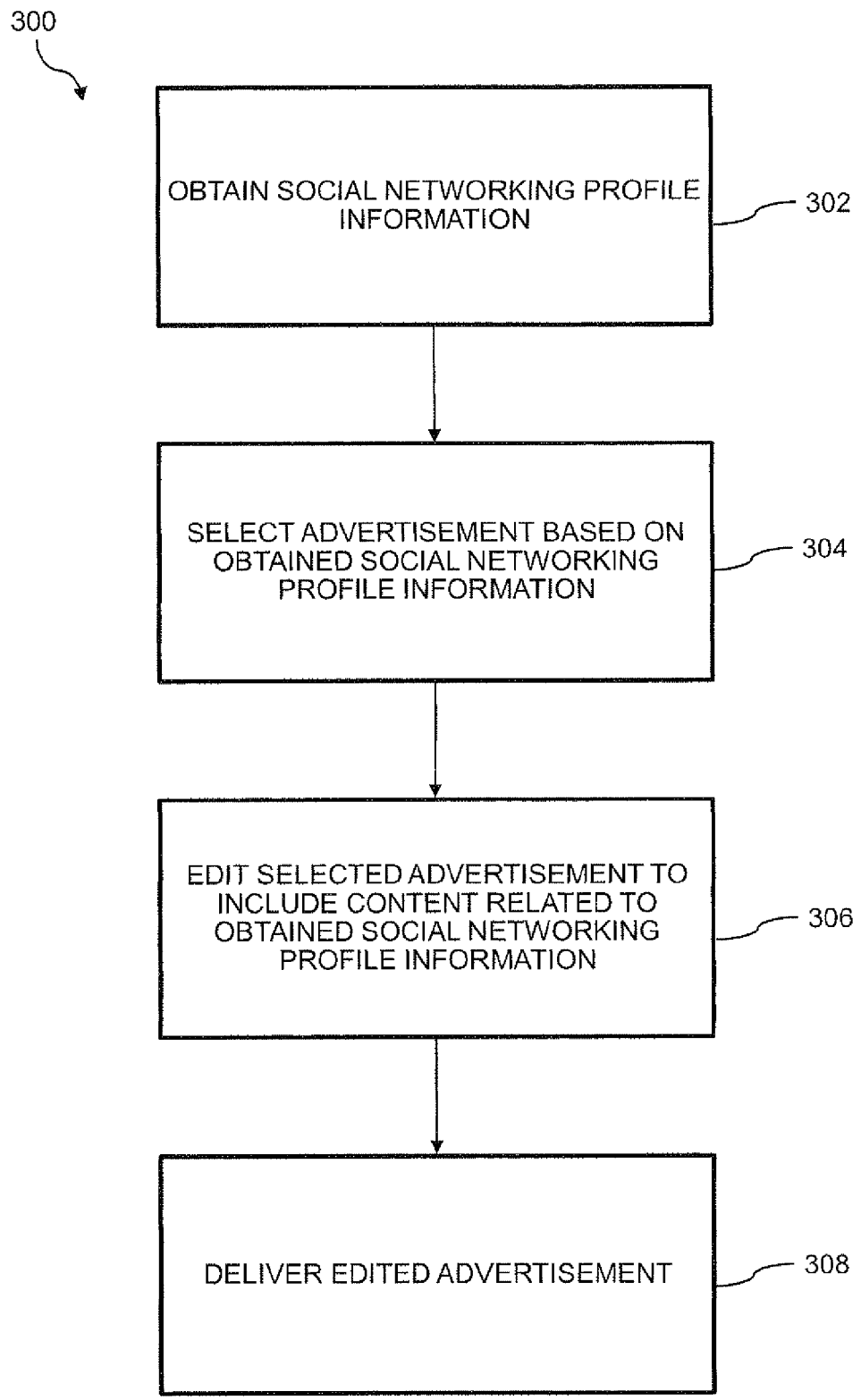
FIG. 3 illustrates a dynamic advertising method according to an embodiment.

FIG. 3 depicts a dynamic advertising method 300 according to an embodiment, wherein dynamic advertising method 300 includes four operations, as follows.

In operation 302, social network profile information of a customer is obtained. In operation 304, an advertisement is selected based on the social networking profiling information obtained in operation 302. In operation 306, the selected advertisement is edited (customized) to include content related to the social networking profile information obtained in operation 302. In operation 308, the edited (i.e., customized) advertisement is delivered to the customer.

The following description describes an example of the dynamic advertising method 300.

First, in operation 302, the ad server 108 obtains social network profiling information of a customer. For example, when the customer 100a logs on to his or her Smart TV to access the Internet and initiate the viewing of television programming using his or her Smart TV, the ad server 108 determines that the customer 100a is currently viewing television programming. Then, the social networking profile information obtaining unit 202 obtains the social networking profile information of the customer 100a. For example, the customer 100a may have recently edited his or her social networking profile information to indicate that the customer 100a has recently downloaded pop music group music to his or her MP3 player. As a result, the ad server 108 can determine, for example, that (1) the customer 100a uses a digital music player, and (2) the customer 100a has a preference for music of the certain pop group.

Second, in operation 304, the advertisement selection unit 204 selects an advertisement based on the social networking profiling information obtained in operation 302. For example, the advertisement selection unit 204 has determined, for example, that (1) the customer 100a uses a digital music player, and (2) the customer 100a has a preference for music of the certain pop group. Based on this analysis, the advertisement selection unit 204 can select an advertisement from among a plurality of generic advertisements stored in the storage unit 206 by matching metadata to the social networking profile information of the user. In this example, since the ad server 108 has determined that the customer 100a uses a digital music player, the ad server 108 can select, for example, a digital music player advertisement stored in the storage unit 206.

Third, in operation 306, the advertisement editing unit 208 edits the selected ad to include content related to the social networking profile information of the customer 100a, thereby customizing the selected ad. For example, the advertisement editing unit 208 can customize the selected ad so that the advertisement for the digital music player includes content related to the given pop group music, thereby achieving an extremely dynamic and personalized advertisement.

Fourth, in operation 308, the advertisement delivery unit 210 prepares the edited advertisement to be delivered to the customer. For example, the advertisement delivery unit formats and encodes the edited advertisement to properly deliver the edited advertisement over the network 104 to the access provider 102, which then delivers the edited advertisement to the customer 100a.

According to another feature, an advertisement auction can be conducted which is coupled with the advertisement editing technique described above. In the advertisement auction, advertisers may participate in a real-time auction to bid on the right to advertise at certain time slots. The advertisement auction could be particularly beneficial for small advertisers who could be charged $0.25 per impression, at a cap of $20/day, and thereby obtain 100 ads over the day (good for budget control). Additionally, in the advertisement auction, advertisers could pay more to get spots on premium time slots. The advertisers could also pay a premium to have advertisements customized.

Furthermore, user feedback could be coupled with the real-time advertisement auction. There are many different ways to implement a user feedback technique. For example, user feedback could indicate whether modified ads are more or less popular than generic ads. Furthermore, another feature is to capture feedback through the user's social network (e.g., Twitter™, Facebook™). For example, a big news article, which is more relevant to the user, could be delivered to the user.

While aspects of the present invention have been described in connection with the illustrated examples, it will be appreciated and understood that modifications may be made without departing from the true spirit and scope of the invention.

What is claimed is:

1. A computer-implemented method of dynamically determining television advertisements to be provided to a customer, the method comprising:
   obtaining profile information of a customer;
   selecting an advertisement based on the obtained profile information;
   editing the selected advertisement to include content related to the obtained profile information; and
   delivering the edited advertisement to the television, wherein:
   the editing of the selected advertisement is performed by injecting at least one of image data, audio data or video data into the selected advertisement, the image data comprises text information of one of the user's birthdate and the user's cell phone number, and movement of the user within the videos from the social networking site of the user are analyzed to locate similar movement to movement of an actor in the advertisement, the located video of the user is superimposed onto the advertisement to replace the character for a portion of the advertisement.

2. The method according to claim 1, wherein the profile information is a social networking profile stored on a social networking site.

3. The method according to claim 2, further comprising:
obtaining feedback from the customer in response to the edited advertisement, and
adjusting at least one characteristic of additional advertisements to be delivered in the future based on the obtained feedback.

4. The method according to claim 2, further comprising dynamically determining television advertisements to be provided to a plurality of customers, including mapping of the advertisements to the customers, storing information relating to the mapping, and transmitting the advertisements to the customers in accordance with the mapping, the transmitting of the advertisements being done by one of an advertisement server and a television service provider.

5. The method according to claim 1, wherein the image data is a photo of the customer's face replacing a face of a person in the advertisement with dynamic distortion to make the photo of the customer's face appear to move with the body of the person in the advertisement to make the photo of the customer's face look real-life and credible within the video, wherein the person in the advertisement approximately matches the profile of the customer with respect to physical characteristics.

6. The method according to claim 1, wherein the image data comprises at least one of an item that the user has purchased before, the user's birthdate, and an image representing a personal eating preference of the user.

7. The method according to claim 1, wherein the image data comprises a picture of the user's house.

8. The method according to claim 1, wherein the image data comprises recoloring portions of the advertisement to correspond to color preferences of the user.

9. The method according to claim 1, wherein the audio data includes voice data of the user's name injected on the audio track of the actor/narrator to make it appear that the actor/narrator in the advert is talking directly to/about the user, while editing the actor/narrator's lip movements to be hidden when the user's name is called out, or replacing the actor/narrator's lip movements with one of a plurality of pre-recorded lip movements that cover different names that produce different lip movements and while the voice data is controlled in accordance with a voice-matching algorithm to match the voice of the actor/narrator in real time.

10. The method according to claim 1, wherein the audio data includes at least one of birthday information of the user or the user's friends or family, information relating to past or planned future travel of the user, the user's favorite music.

11. The method according to claim 1, wherein the audio data includes keywords and accents of the user's voice to mimic the user's voice or the voice of the user's relative or friend in saying a phrase of the advertisement to give the effect of the mimicked voice being used directly to say a portion of the advertisement.

12. The method according to claim 1, wherein a snippet from the social networking site of the user is identified wherein the user says a certain thing that one of matches a portion of the advertisement, wherein the snippet is embedded within the advertisement to replace the matched portion, and is appropriate narrative for a portion of the advertisement.

13. The method according to claim 1, wherein the delivering of the edited advertisement to the television is performed in one of real-time and non-real-time.

14. An advertisement server, comprising:
a profile information obtaining unit configured to obtain profile information associated with a customer;
an advertisement selecting unit configured to select an advertisement based on the obtained profile information;
an advertisement editing unit configured to edit the selected advertisement to include content related to the obtained social networking profile information; and
an advertisement delivery unit configured to deliver the edited advertisement to the television, wherein:
the editing of the selected advertisement is performed by injecting at least one of image data, audio data or video data into the selected advertisement, and
the image data comprises text information of one of the user's birthdate and the user's cell phone number, and
movement of the user within the videos from the social networking site of the user are analyzed to locate similar movement to movement of an actor in the advertisement, the located video of the user is superimposed onto the advertisement to replace the character for a portion of the advertisement.

15. A computer-implemented dynamic advertising system, comprising:
a television configured to access the Internet and further configured to display television programming; and
an advertisement server connected to the television over the Internet,
wherein at least one of the television and the advertisement server are configured to select an advertisement based on obtained profile information of a customer, and edit the selected advertisement to include content related to the obtained profile information of the customer, wherein:
the editing of the selected advertisement is performed by injecting at least one of image data, audio data or video data into the selected advertisement, and
the image data comprises text information of one of the user's birthdate and the user's cell phone number, and
movement of the user within the videos from the social networking site of the user are analyzed to locate similar movement to movement of an actor in the advertisement, the located video of the user is superimposed onto the advertisement to replace the character for a portion of the advertisement.

16. A non-transitory computer-readable storage medium containing program code enabling dynamic determining of television advertisements to be provided to a customer, the medium comprising:
(a) program code for obtaining profile information of a customer;
(b) program code for selecting an advertisement based on the obtained social networking profile information;
(c) program code for editing the selected advertisement to include content related to the obtained social networking profile information; and
(d) program code for delivering the edited advertisement to the television, wherein:
the editing of the selected advertisement is performed by injecting at least one of image data, audio data or video data into the selected advertisement, the image data comprises text information of one of the user's birthdate and the user's cell phone number, and movement of the user within the videos from the social networking site of the user are analyzed to locate similar movement to movement of an actor in the advertisement, the located video of the user is superimposed onto the advertisement to replace the character for a portion of the advertisement.

17. A computer-implemented method of dynamically determining television advertisements to be provided to a customer, the method comprising:

obtaining profile information of a customer;

selecting an advertisement based on the obtained profile information;

editing the selected advertisement to include content related to the obtained profile information; and delivering the edited advertisement to the television, wherein:

the editing of the selected advertisement is performed by injecting at least one of image data, audio data or video data into the selected advertisement, the image data comprises a picture of the user's house, and movement of the user within the videos from the social networking site of the user are analyzed to locate similar movement to movement of an actor in the advertisement, the located video of the user is superimposed onto the advertisement to replace the character for a portion of the advertisement.

18. A computer-implemented method of dynamically determining television advertisements to be provided to a customer, the method comprising:

obtaining profile information of a customer;

selecting an advertisement based on the obtained profile information;

editing the selected advertisement to include content related to the obtained profile information; and delivering the edited advertisement to the television, wherein:

the editing of the selected advertisement is performed by injecting at least one of image data, audio data or video data into the selected advertisement, the audio data includes voice data of the user's name injected on the audio track of the actor/narrator to make it appear that the actor/narrator in the advert is talking directly to/about the user, while editing the actor/narrator's lip movements to be hidden when the user's name is called out, or replacing the actor/narrator's lip movements with one of a plurality of pre-recorded lip movements that cover different names that produce different lip movements and while the voice data is controlled in accordance with a voice-matching algorithm to match the voice of the actor/narrator in real time, and movement of the user within the videos from the social networking site of the user are analyzed to locate similar movement to movement of an actor in the advertisement, the located video of the user is superimposed onto the advertisement to replace the character for a portion of the advertisement.

19. A computer-implemented method of dynamically determining television advertisements to be provided to a customer, the method comprising:

obtaining profile information of a customer;

selecting an advertisement based on the obtained profile information;

editing the selected advertisement to include content related to the obtained profile information; and delivering the edited advertisement to the television, wherein:

the editing of the selected advertisement is performed by injecting at least one of image data, audio data or video data into the selected advertisement, the audio data includes keywords and accents of the user's voice to mimic the user's voice or the voice of the user's relative or friend in saying a phrase of the advertisement to give the effect of the mimicked voice being used directly to say a portion of the advertisement, and movement of the user within the videos from the social networking site of the user are analyzed to locate similar movement to movement of an actor in the advertisement, the located video of the user is superimposed onto the advertisement to replace the character for a portion of the advertisement.

20. A computer-implemented method of dynamically determining television advertisements to be provided to a customer, the method comprising:

obtaining profile information of a customer;

selecting an advertisement based on the obtained profile information;

editing the selected advertisement to include content related to the obtained profile information; and delivering the edited advertisement to the television, wherein:

the editing of the selected advertisement is performed by injecting at least one of image data, audio data or video data into the selected advertisement, and movement of the user within the videos from the social networking site of the user are analyzed to locate similar movement to movement of an actor in the advertisement, the located video of the user is superimposed onto the advertisement to replace the character for a portion of the advertisement.

* * * * *